United States Patent [19]

Sellnau

[11] Patent Number: 5,367,904

[45] Date of Patent: Nov. 29, 1994

[54] NON-INTRUSIVE CYLINDER PRESSURE SENSOR HAVING IMPROVED RESPONSE CHARACTERISTICS

[75] Inventor: Mark C. Sellnau, Bloomfield Hills, Mich.

[73] Assignee: General Motors Corporation, Detroit, Mich.

[21] Appl. No.: 35,139

[22] Filed: Mar. 19, 1993

[51] Int. Cl.⁵ .................. G01L 23/22; G01M 15/00
[52] U.S. Cl. ........................................ 73/115; 73/35
[58] Field of Search ............. 73/35, 115, 116, 117.3; 123/494, 425, 435

[56] References Cited

U.S. PATENT DOCUMENTS

| | | | |
|---|---|---|---|
| 3,707,107 | 12/1972 | Bieri | 85/1 T |
| 4,294,559 | 10/1981 | Schutzler | 411/132 |
| 4,599,021 | 7/1986 | Kloster | 411/437 |
| 4,601,196 | 7/1986 | Frelund | 73/115 |
| 4,602,506 | 7/1986 | Sawamoto et al. | 73/115 |
| 4,969,352 | 11/1990 | Sellnau | 73/115 |
| 5,101,659 | 4/1992 | Takeuchi | 73/115 |
| 5,127,784 | 7/1992 | Eslinger | 411/414 |
| 5,142,914 | 9/1992 | Kusakabe et al. | 73/115 |

*Primary Examiner*—Hezron E. Williams
*Assistant Examiner*—George M. Dombroske
*Attorney, Agent, or Firm*—Vincent A. Cichosz

[57] ABSTRACT

An improved combustion pressure sensor of the type measuring flexure of a first wall relative to a second wall along a response axis is characterized by linear response over a relatively wide range of preload forces. Various sensor engagements provide for minimal transmutation of forces along the response axis to any other direction, thereby improving linearity of response, durability and serviceability of the sensor.

8 Claims, 6 Drawing Sheets

NON-INTRUSIVE CYLINDER PRESSURE SENSOR HAVING IMPROVED RESPONSE CHARACTERISTICS

BACKGROUND OF THE INVENTION

It is known in the field relating to internal combustion engines to utilize cylinder pressure sensors for monitoring and controlling various processes, among them being combustion knock, misfire and associated combustion dilution and combustion phasing.

This invention relates to cylinder pressure sensors and more particularly to non-intrusive sensors having no direct contact with the harsh environment of a cylinder. Non-intrusive sensors measuring combustion pressure remote from direct contact with combustion are known which take various applications. Some applications include trapped force ring arrangements such as a piezoelectric annulus between cylinder head bolts and an engine block or alternatively between a spark plug seat and spark plug. Other non-intrusive sensors include probe type and annular insert type which respond to flexure of a first wall defining in part a cylinder relative to a second rigid wall in an engine head. The latter mentioned types of non-intrusive sensors, embodiments of which are set out in U.S. Pat. Nos. 4,601,196 to Frelund and 4,969,352 to Sellnau (both assigned to the assignee of the present invention), improve upon signal quality shortfalls of the former mentioned types and are preferred among alternatives.

Some advantages of the preferred probe type and annular insert type sensors over other non-intrusive pressure sensors include reduced dynamic phase lag, relative insensitivity to extraneous loads, lower operating temperature and other advantages due to their placement in proximity to the cylinder.

While the preferred non-intrusive sensors present substantial betterments to the field of cylinder pressure sensing, further improvements can be made. For example, a certain degree of non-linear response and gain variation from sensor to sensor are present with the preferred related art sensors. These undesirable characteristics tend to be exacerbated when the sensor structural material has a modulus of elasticity and yield strength of limited magnitude—such as is characteristic of aluminum and alloys thereof. This presents practical problems since modern combustion engines commonly have cylinder heads of aluminum alloys and, for reasons of matching thermal expansion characteristics of the sensor thereto, the sensor structural material is preferably similar.

Further, preferred non-intrusive sensors may tend to be sensitive to variations in installation preload caused for example by piezoelectric sensitivity, thread effects and other interface effects thereby demanding relatively tight control over preload. It is desirable that the preferred sensors be insensitive to installation variance such as is typically experienced when conventional torque monitoring is utilized to control threaded installations in an assembly environment, or alternatively as can be experienced in less controlled servicing situations.

SUMMARY OF THE INVENTION

The present invention involves the application of non-intrusive cylinder pressure sensors of the types generally functioning as those shown in Sellnau and Frelund in an engine component, or more specifically, in an engine cylinder head. Structurally the cylinder head has a first wall defining a portion of a cylinder. The first wall flexes in response to variations in cylinder pressure. A second wall located a distance away from the first wall is relatively static with respect to variations in cylinder pressure. The first wall may provide mounting means for a spark plug with the sensor configured as an annular insert installed within a spark plug access well between the first and second walls. The first wall may alternatively define a portion of a coolant channel in the cylinder head or comprise any other appropriate portion of the cylinder head defining in part a cylinder or having combustion forces translated directly thereto. Where the particular application so dictates, the sensor may be configured substantially as a probe between a first and second wall.

In a preferred exemplary embodiment, the engine has a spark plug access well located at a top portion of each cylinder and substantially defined by an annular wall between the first wall and the second wall. The first wall defines in part the cylinder and has an opening for installation of a spark plug therethrough. The first wall further has a mounting boss of larger diameter than the spark plug. The second wall has an opening substantially defined by the annular wall. The sensor takes the form of an annular insert with a top portion being engaged to the second wall and a lower portion thereof being in compressive engagement with the mounting boss. The load produced by combustion pressure is thus transferred through the first wall and split between the annular wall and the sensor. The portion of load transferred through the sensor terminates locally at the second substantially static wall via the engagement interface therebetween. Linearity of sensor response is determined to a great extent by the character of load transfer through the mounting threads that engage the sensor to the second wall since the threads are relatively compliant compared to the remaining structure. It is therefore one object of the invention to provide substantially complete axial translation of axial sensor loads from the sensor to the second wall along the response axis.

Another object of the invention is to provide a sensor having a wide range of acceptable preload force thereby reducing the need for high precision installation monitoring and making it suitable for conventional torque monitored installation.

Still another object of the invention is to provide a sensor that exhibits improved durability and ability to withstand the substantial forces placed upon it while maintaining performance levels over time and cycles.

This invention benefits from and retains all advantages of the related art non-intrusive pressure sensors upon which it intended to improve. Improvements and advantages will be more fully understood and appreciated from the following detailed description taken together with the accompanying drawings.

DETAILED DESCRIPTION OF A PREFERRED EMBODIMENT

The invention and detailed description of a preferred embodiment can best be understood when explained in relation to performance improvements over preferred related art sensors. As such, significant description of related art sensor performance is given herein and is not presented as a recitation of any well known information in the art, rather it is presented conversely as illustrative of significant discovery by the inventor through his research which forms the basis for the inventive aspects of the present invention.

Figure 1A:
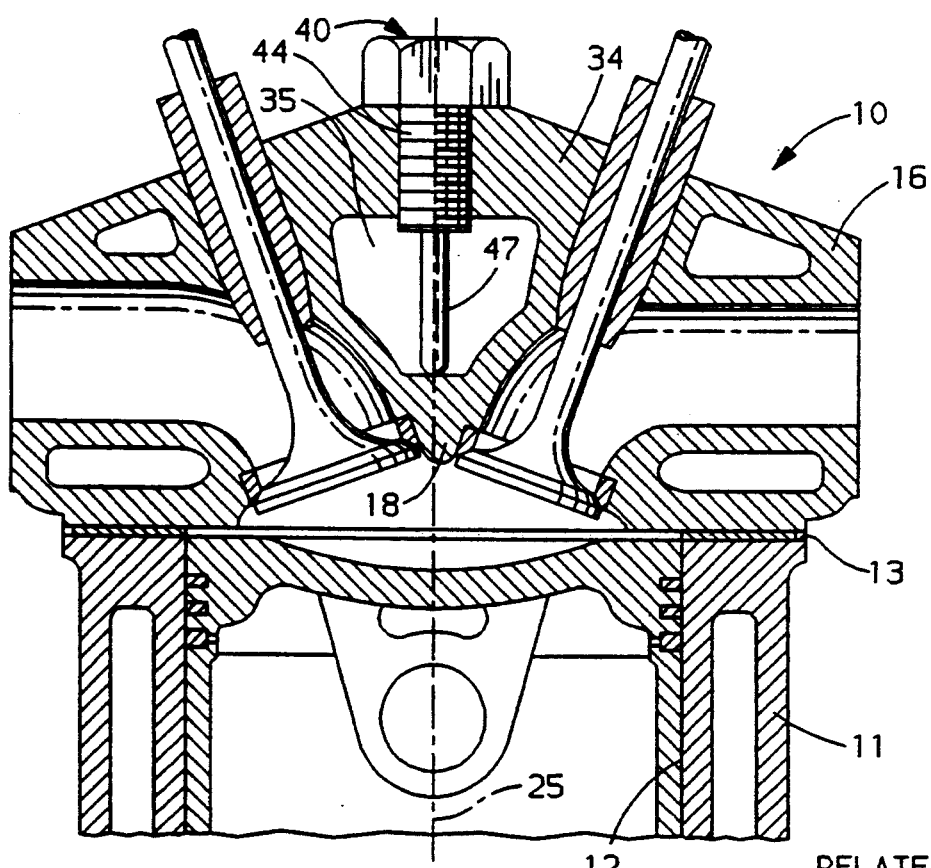
FIGS. 1a–1c show related art non-intrusive cylinder pressure sensors.

Referring first to Figure 1a, an engine generally designated as numeral 10 has a plurality of cylinders 12 only one of which is shown in the diagram. Cylinders are defined in cylinder block 11 and are open at an upper surface 13. Engine cylinder head 16 closes on surface 13 to form a cylinder with cylinder 12. Engine head 16 includes a lower wall 18 defining a portion of the cylinder and a remote wall 4 not directly exposed to the cylinder. Coolant passage 35 is partially defined between walls 18 and 34. Wall 18 being exposed directly to the combustion pressure in the cylinder flexes in response thereto. Remote wall 34 not being directly exposed to combustion pressure in the cylinder is relatively rigid and does not flex in response to combustion therein.

Related art annular insert type sensors conventionally employ compression mode piezoceramics as sensing elements. In theory, a piezoceramic can function linearly at zero preload; however, in practice small surface irregularities either on the piezoceramic or mating surface may compromise load transfer. Similarly, surface irregularities at any interface in the load path can compromise linearity of response. Surface bonding of components at their interfaces may reduce the effects of these irregularities. Alternately, and desirably for simplified assembly, sensor preload is used to force these surfaces together into substantially uniform contact across the sensing element cross-section.

A probe type pressure sensor generally designated as numeral 40 is shown in compressive preload arrangement along response axis 25. Sensor 40 has a main portion 44 threadably engaged into a threaded opening in wall 34. A load transferring probe portion 47 extends from main portion 44 to engage wall 18. Flexure of wall 18 is transmuted along probe 47 to be measured by sensor 40. Ideally, sensor 40 is engaged to wall 34 such that no relative movement occurs therebetween. However, experience has shown that conventional threaded engagement may compromise load transfer and signal quality of the sensor.

Figure 1B:
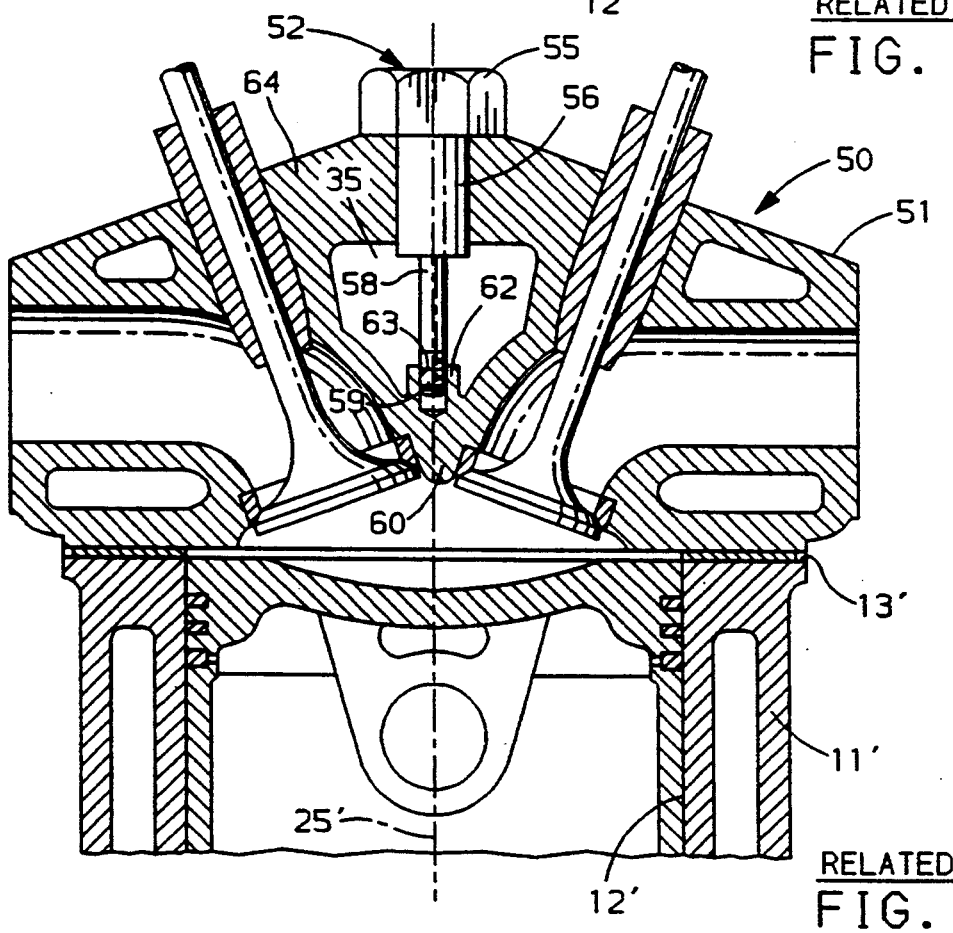

Referring now to FIG. 1b, a similar probe type sensor 52 is shown in tensile preload arrangement along response axis 25' in engine 50 cylinder head 51. Similar engine features between FIGS. 1a and 1b are designated by similar primed numbers. Wall 60 is directly exposed to combustion forces and wall 64 is remote therefrom. Sensor 52 has main portion 56 passing through wall 64. Wall 60 has threaded opening 59 in boss 62 into which probe portion 58 is threadably engaged at threaded portion 63 thereof. Sensor 52 has mounting head 55 with lower shoulders engaging block 51 such that sensor 52 is tensibly prestressed. In this arrangement with conventional threads, similar compromises in sensor performance may be encountered.

Figure 1C:
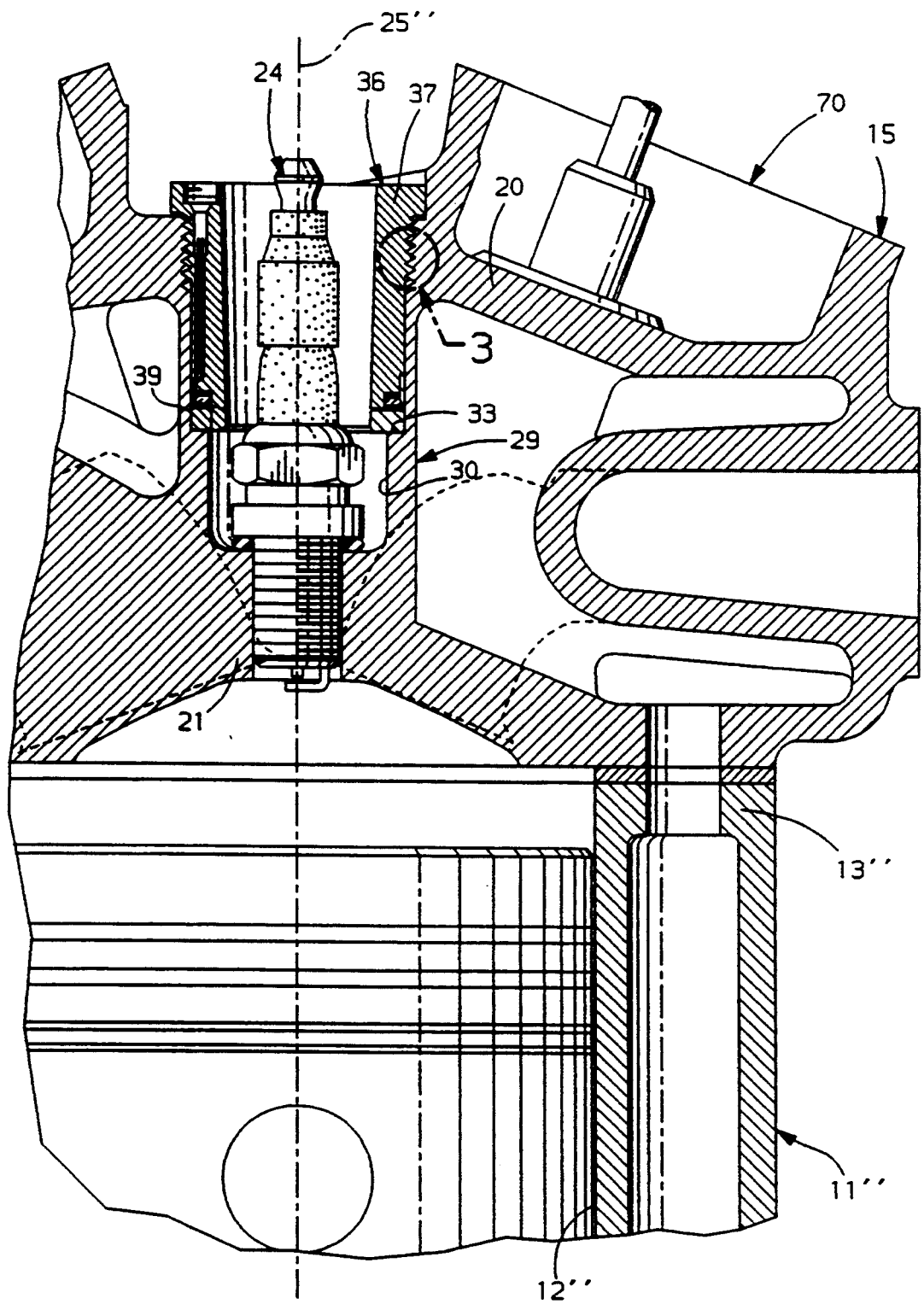

Referring now to FIG. 1c and yet another related art pressure sensor is shown which is responsive to flexure of a first wall defining in part a cylinder relative to a second wall remote from direct exposure to cylinder pressure. Again, similar engine features between FIGS. 1a, 1b and 1c are designated by similar primed numbers. Pressure sensor 37 is shown as an annular insert type in compressive preload arrangement along response axis 25'' in engine 70 cylinder head 15. Sensor 36 has lower portion 39 engaged to annular boss 33 extending from wall 21 which is directly exposed to combustion pressure. Annular boss 33 is an annular ledge set back from spark plug 24 access well inner wall 30. The access well is defined by annular wall 29 extending between wall 21 and wall 20. Upper portion 37 of sensor 36 is shown threadably engaged to upper wall 20. Again, in this arrangement the conventional threaded engagement of sensor 37 to an upper wall proves to be similarly problematic with respect to the performance of the sensor.

Conventional threaded engagements, as commonly employed and previously referred to, have a load transfer surface, hereinafter load flank, and a relief flank making equal angles with a line perpendicular to the threaded member major axis. Examples include a 60° standard V-thread having a load flank angle of 30° and a relief flank angle of 30° and will hereafter be associated with conventional threaded engagement.

When used with sensor bodies that are thin walled, conventional threads may introduce radial loads that compromise linearity of load transfer axially through the sensor. A sensor body of an annular insert type sensor may be considered as a thin-walled tube with 30° load flank that act as inclined planes which cause wedging when axial loads are applied to the sensor body. Conventional threads can operate in a first mode characterized by slip (relative sliding motion) between load flank interface surfaces and a second mode characterized by non-slip therebetween. Depending upon variables at the thread interface such as roughness, lube, hardness and plating alloy, slip behavior may introduce hysteresis into the load path and ultimately into the sensor output signal. This type of signal error is expected to vary significantly and unpredictably. Non-slip behavior may be caused by welding or galling of the threads, high friction coefficients or inadequate lubrication. Load transfer in this case would be quite linear since the interface effectively behaves as an integral and continuous structure. However, it may be too precarious a position to expect consistent non-slip behavior induced by these factors will be obtained and thereafter maintained with any degree of predictability or repeatability. Additionally, galling of thread surfaces would cause irreparable harm and unacceptable damage thereto.

Radial loading associated with wedging at the conventional threaded engagement may also contribute to some loss of sensor preload. This would be especially true where the yield strength (creep resistance) of the sensor body material is relatively low or where the annular wall of the sensor body is narrow. Over many stress cycles at elevated temperatures, the sensor could creep diametrically causing an associated axial unloading of preload leading to erroneous output and/or sensor failure.

Figure 2A:
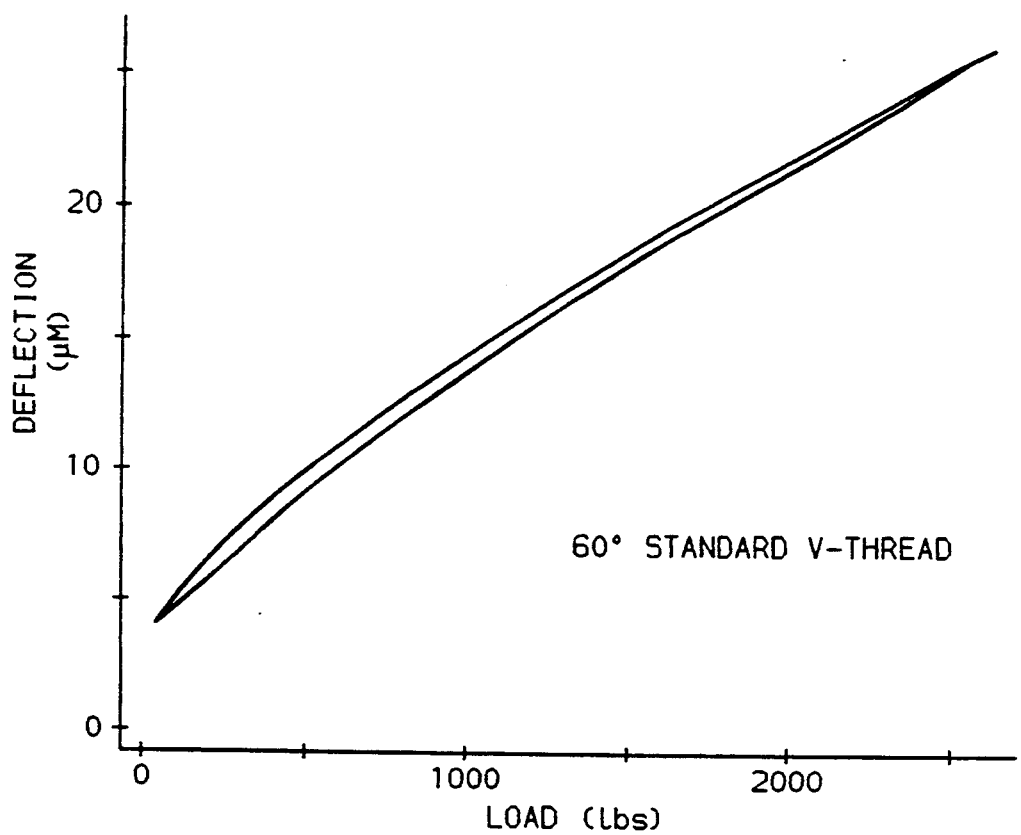
FIGS. 2a and 2c are graphs illustrating experimental results demonstrative of various characteristics of related art annular insert type non-intrusive cylinder pressure sensors.
Figure 2B:
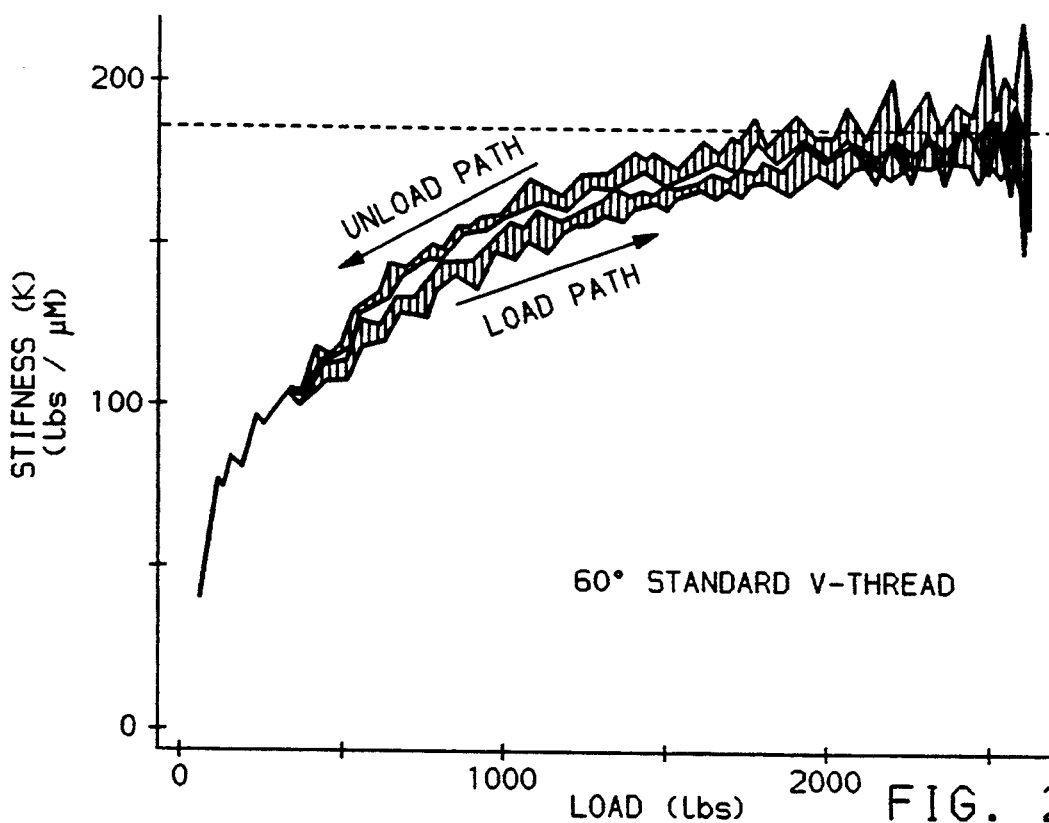
Figure 2C:
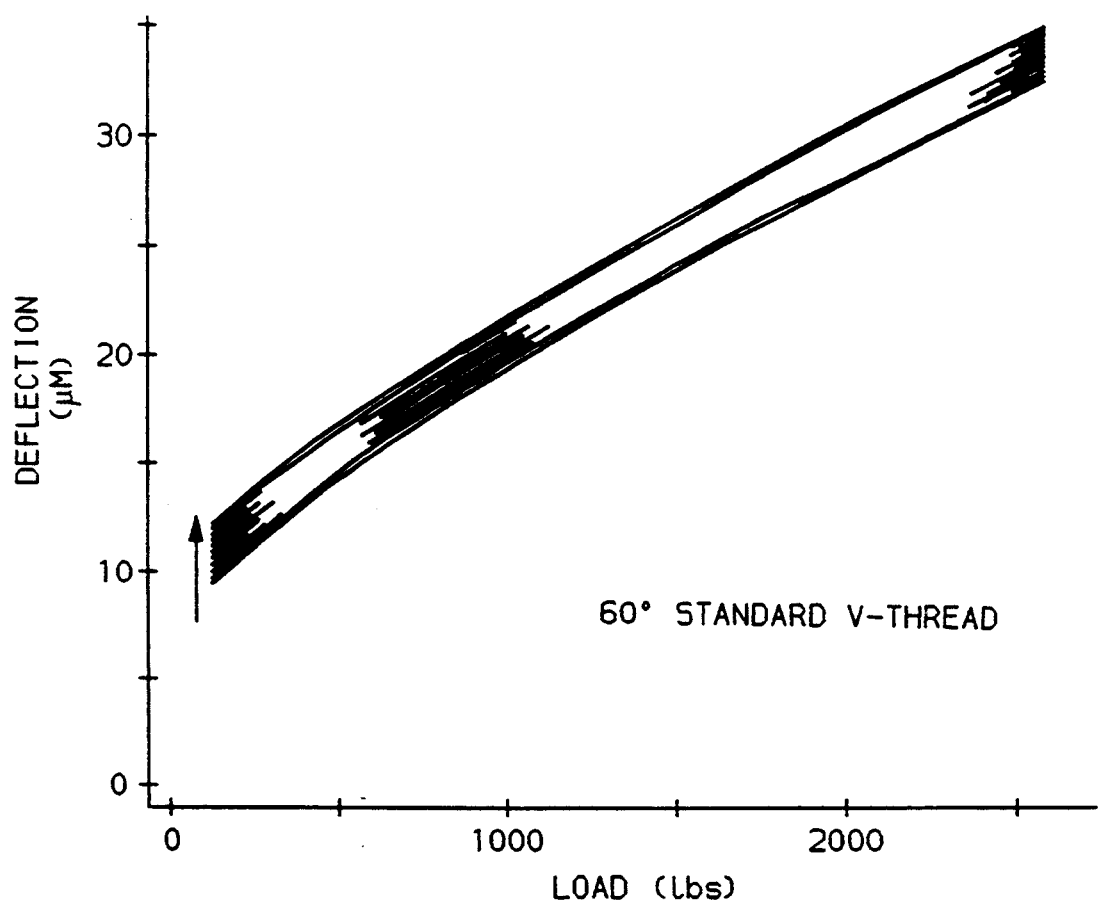

Referring now to FIGS. 2a through 2c, the types of behavior encountered with conventional threads used to engage an annular insert type sensor to one of the two walls are demonstrated. The curves represent laboratory measurements obtained from quasi-static axial loading tests on a material test machine. A substantially uniform cylindrical body of aluminum alloy was used for the tests as a preferred material for use in actual sensor applications in common aluminum alloy cylinder heads. Inner diameter of the cylindrical body was approximately 24.6 mm, outer diameter was approximately 31.9 mm (for a wall thickness of approximately 3.65 mm) and 60° standard V-threads were used as the conventional threads. The cylindrical body was secured at the threads to a static reference block and loaded axially. Axial deflection was recorded at two diametrically opposed positions around the cylindrical body using a pair of research grade sensors to measure axial load transfer behavior. To avoid overlay of data for ease of readability, the figures are representative of data generated at only one of the research grade sensors. The figures are generally representative of the thread behavior.

Referring specifically to FIG. 2a, the vertical axis indicates thread deflection and the horizontal axis indicates axial load applied to the cylindrical body. This load was positioned on the axial center line of the body and applied uniformly on the body face. A curve corresponding to one of the two diametrically opposed position is shown which indicates that as the cylindrical body is loaded and unloaded, such as in combustion cycles, hysteretic displacement results. This behavior may be attributable to the various slip and non-slip behaviors of the threads.

Referring now to FIG. 2b, the vertical axis indicates thread stiffness (k) and the horizontal axis again indicates load applied axially to the sensor. The stiffness is by definition the reciprocal of the slope of deflection vs. load curves, such as that shown in FIG. 2a. Raw data (unfiltered and unsmoothed) was used to generate the hatched curves of FIG. 2b over several load and unload cycles. The solid line represents a best fit curve to the most linear and constant stiffness portion of the data. The curves demonstrate how the stiffness for conventional thread engagement varies with load. Stiffness in the case of conventional threads only approaches constancy (linear horizontal curve) at the far right of the curve through a narrow envelope of substantial load. Also noted in the curves of FIG. 2b is the dependence that the conventional thread shows upon load and unload portions of a cycle caused by the hysteretic behavior as previously described with reference to FIG. 2a. Since the stiffness of the sensor threads has a direct influence upon gain and sensitivity, the operation of the sensor with conventional threads would realistically be limited substantially to the narrow, large magnitude preload range exhibiting flat stiffness. This limits bandwidth of sensor operation and demands tight preload monitoring. The steeply sloping load-unload dependent portion of the curve delineates an undesirable range of operating preloads since even more precise preloading would be required in order to ensure that the sensor gain is within a band compatible with any interfaced control electronics. Ideally, one would like to see no slope or minimally sloping stiffness curve between a wide range of preload forces so that installation or reinstallation of a sensor would not need to be closely monitored as far as preload force is concerned. Precise monitoring and/or inspection of preload force is generally quite expensive and cumbersome.

The curve in FIG. 2c is derived from data obtained during an accelerated creep simulation test, the vertical axis indicating thread deflection and the horizontal axis indicating load. A cylindrical body having an annular wall of reduced thickness (approximately 50% that used in the hysteresis and stiffness tests of FIGS. 2a and 2b) was used in the accelerated creep testing. Identical thread forms were used (60° standard V-thread) The curve exhibits rapid deformation of the threaded interface within the first decade of load cycles and suggests that conventional threads in conjunction with a full thickness annular wall may exhibit similar deformation over a sensor's lifetime.

Figure 3:
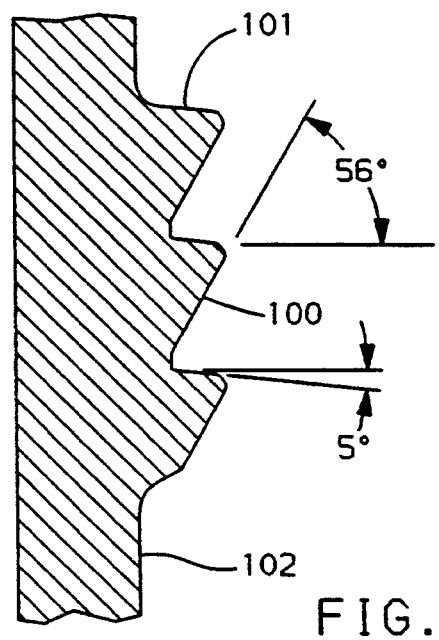
FIG. 3 shows an exemplary embodiment of a portion of an annular insert type non-intrusive cylinder pressure sensor according to the invention.

Referring now to FIG. 3, a cross sectional illustration of a threaded portion of an annular type sensor shows a preferred thread form according to the invention. To avoid unnecessary duplication of illustrations, the circled portion of FIG. 1c referenced as numeral 3 indicates the general area for application of the preferred thread form shown in FIG. 3. FIG. 3 is also consistent with the thread form tested in comparison to the conventional threads previously described. The thread arrangement is generically referred to as a buttress thread and has a load flank substantially normal to the direction of the preload and compressive forces and a relief flank triangulated therefrom at a relatively wide angle. Buttress thread (ANSI B1.9) is one exemplary type of buttress thread suited for application hereto and has a load flank angle of 7° and a relief angle of 45°. Other flank angle geometries are fully within the contemplated scope of the present invention, ANSI B1.9 being mentioned herein as exemplary and not limiting. A preferred thread geometry, and the one illustrated in FIG. 3 and tested in comparison to the 60° standard V-thread has a load flank angle of 5° and a relief angle of approximately 56°, both angles being measured relative to a line perpendicular to the threaded member's major axis. A portion of the sensor body wall is illustrated as 102.

Having an axial force introduced on the substantially normal surface limits the transfer of that force to a radial direction due to wedging at the threads. With conventional threads, the load bearing flank has a much greater angle offsetting it from a normal position relative the sensor axis and any force introduced on that load bearing flank would introduce radial compression of the sensor, and deformation of the sensor threads and body sufficient to cause undesirable hysteretic, gain and creep behavior heretofore explained and illustrated with reference to FIGS. 2a–2c. Preferably, for ease of manufacture using conventional high-speed cutting tools, the buttress type thread is machined with the load bearing flank not quite normal to the direction of the force. However, the load bearing flank is substantially normal to the load so as to greatly limit undesirable slip and non-slip behaviors.

Aluminum alloys are commonly used for cylinder heads because of mass and corrosion advantages over cast iron, but stiffness, creep and fatigue properties are somewhat poorer with respect thereto. For similar mass and corrosion advantages, aluminum alloys are an advantageous choice for the sensor body. Also, an aluminum alloy for the sensor body is preferred where the cylinder head to which it is matched is an aluminum alloy because of similar thermal expansion properties. Such matching of thermal expansion properties will reduce the effects that an expansion differential has upon sensor preload thereby allowing use of lower preloads and component stresses. Both improved durability and preload maintenance are expected. Without such a buttress thread for an aluminum alloy cylinder head and mating sensor body, conventional threads thereon will tend to introduce undesirable deformation upon the sensor body more so than they would if they were on a material with greater modulus of elasticity and yield strength. Therefore, the import of the present invention is heightened in view of modern combustion engines which commonly employ aluminum alloy heads. It is likewise desirable to prevent galling of the threads which is quite likely with raw aluminum components. This can be accomplished by anodic deposition of a file-hard coating or alternatively by establishing a nickel coating such as by electrolysis over the threads of the sensor.

Figure 4A:
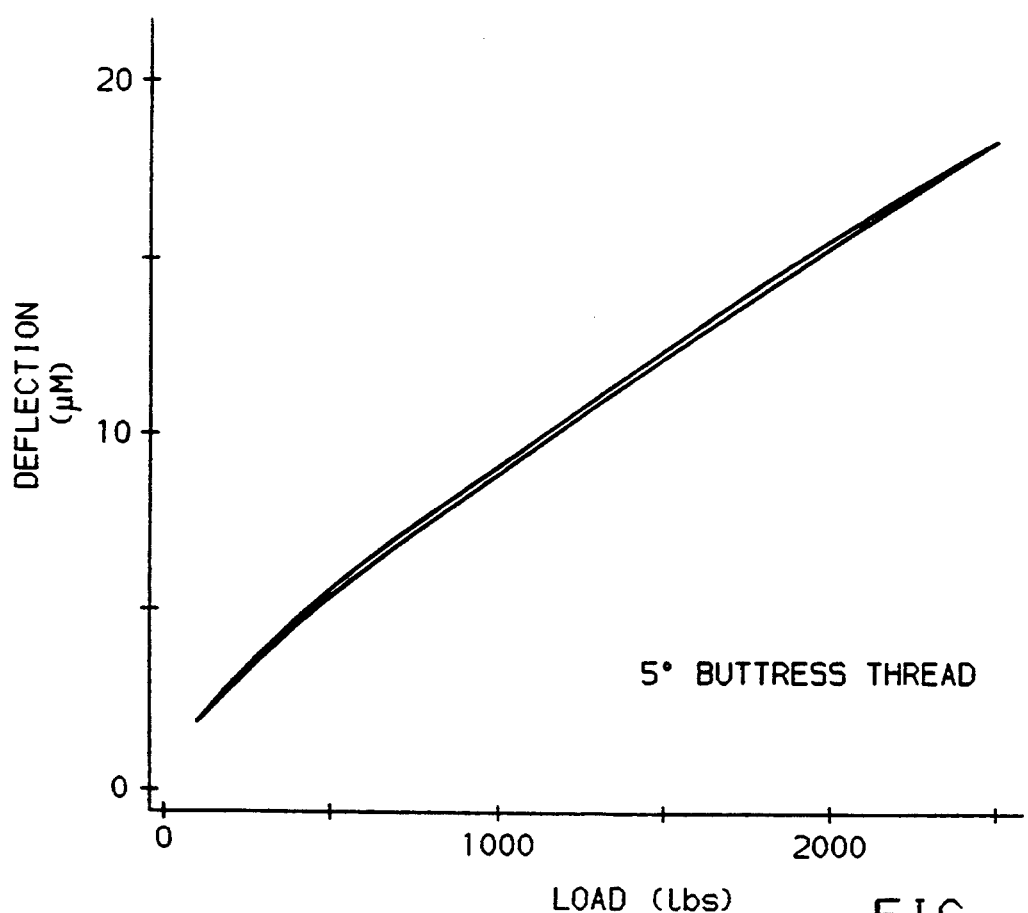
FIGS. 4a–4c are graphs illustrating experimental results demonstrative of characteristics of an exemplary embodiment of an annular insert type non-intrusive cylinder pressure sensor according to the invention and as partially illustrated in FIG. 3.
Figure 4B:
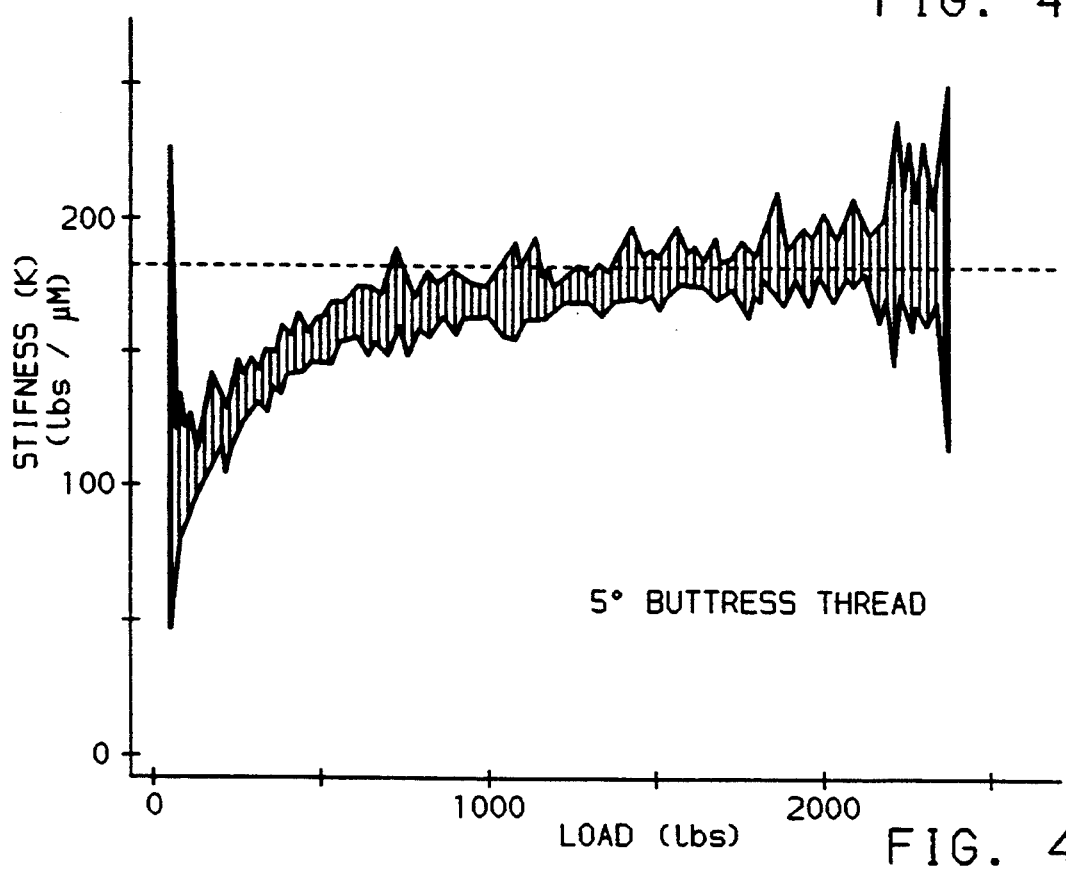
Figure 4C:
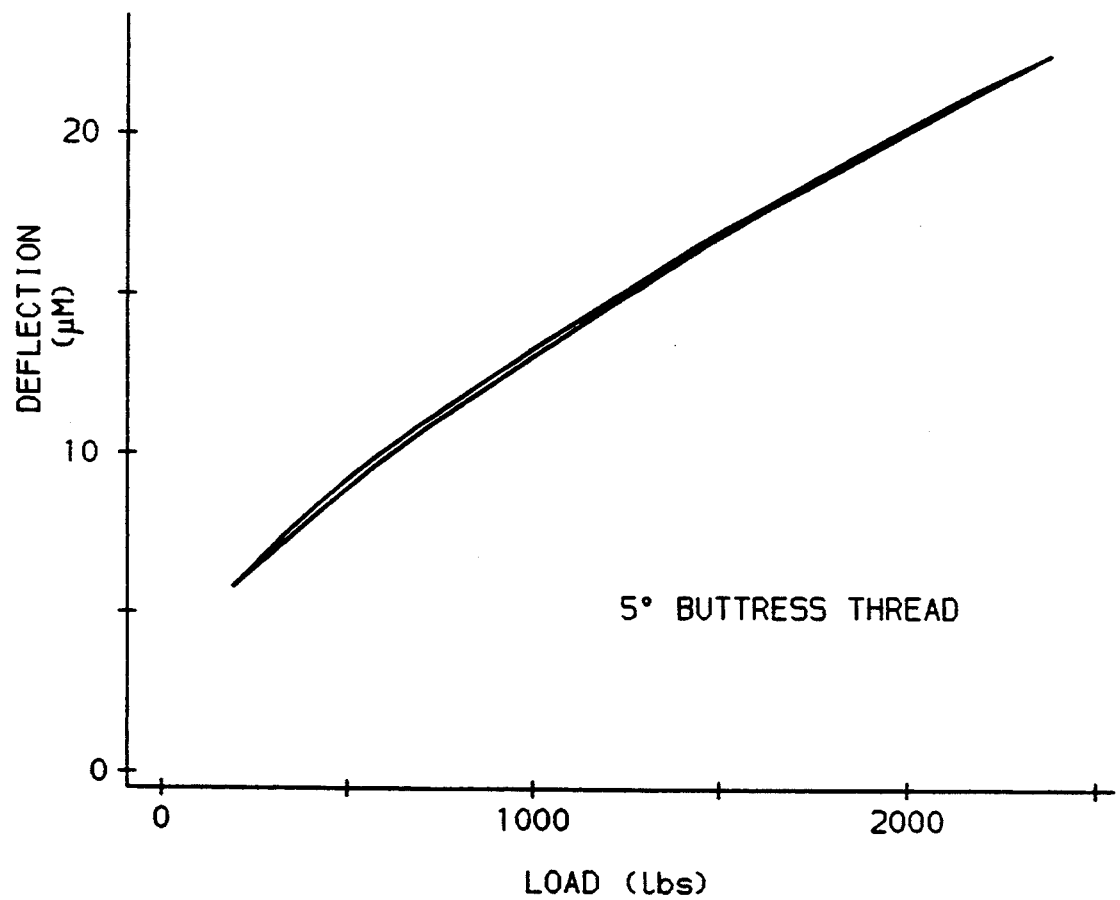

FIGS. 4a through 4c show improvements to the types of behavior encountered with conventional threads and can be compared directly to corresponding FIGS. 2a through 2c. Again, the curves represent laboratory measurements obtained from quasi-static axial loading tests on a material test machine. The material tested and methods of testing correspond substantially identically to those which generated the data used in FIGS. 2a through 2c; the only difference being in the thread form used for the test. Here, the aluminum alloy body sports a buttress thread as heretofore described and illustrated in FIG. 3 having a load flank angle of substantially 5° and a relief angle of substantially 56°. In directly comparing FIG. 4a with FIG. 2a, one can see the significant improvement in hysteretic behavior. In the buttress thread arrangement, as load is applied and relaxed along the horizontal axis, one can see that the load and relax paths are not significantly separated from each other. The curve in FIG. 4b, illustrative of the stiffness of the buttress thread arrangement and derived from the data used to generate the curves in FIG. 4a, shows improved stiffness characteristics over that shown in FIG. 2b. The range of preload forces corresponding to relatively constant stiffness is not only significantly wider, but also extends through lower preload forces. Also noted here is the lack of load-unload dependency shown in FIG. 2b as caused by the hysteretic performance of conventional threads. Thus the broadened range of preload force through which stiffness is constant allows for a much larger tolerance in installation preload about a lesser nominal magnitude of preload, thereby eliminating precise preload force monitoring during original installation or reinstallation after service.

The curve in FIG. 4c is, similar to that in FIG. 2c, derived from data obtained during an accelerated creep simulation test, the vertical axis indicating thread deflection and the horizontal axis indicating load. An annular wall of reduced thickness was used in the accelerated testing. The curve shows no measured creep or deformation of buttress threads or increased hysteresis. These results suggest that buttress threads in conjunction with a full thickness annular wall may exhibit similar desirable performance properties over the sensor's lifetime.

In addition to the preferred embodiment described in reference to FIG. 3, other alternative arrangements would place buttress threads on a probe type sensor similar to those shown in FIGS. 1a and 1b. Again, axial forces are not transmuted radially due to the substantially normal load bearing flank of the buttress thread. The threads in an arrangement such as that shown in FIG. 1b are disposed on the lower probe member with the load bearing flank of the buttress thread supporting a tensile preload. Improvements and advantages heretofore described are equally applicable to these two probe type sensor embodiments. Other embodiments envisioned within the scope and spirit of the present invention include engagement means other than threads such as keyed flanges provided that substantially all loads introduced axially are not transmuted to a radial direction. The exemplary embodiment described herein is offered by way of exposition of the best mode to practice the invention as contemplated by the inventor; and it is to be understood that within the scope of the appended claims the present invention may be practiced by alternatives or modifications otherwise than as specifically described.

The embodiments of the invention in which an exclusive property or privilege is claimed are defined as follows:

1. In an internal combustion engine, a cylinder pressure sensor of the type being responsive to force along a response axis thereof and disposed between a first wall and a second wall of an engine component housing, the first wall substantially defining at least one side of a cylinder and flexing in response to varying pressure therein and the second wall being relatively rigid, the improvement comprising:
   a sensor assembly including a first end and a second end substantially aligned with the response axis;
   the first end of the sensor assembly engaged with one of the walls;
   means for engaging the second end of the sensor assembly with the other of the walls to pre-stress the sensor along the response axis; and
   means for preventing loads generated along the response axis from being transmuted to radial loads upon the sensor assembly.

2. In an internal combustion engine, a cylinder pressure sensor of the type disposed between a first wall and a second wall of an engine component housing, the first wall substantially defining at least one side of a cylinder and flexing in response to varying pressure therein and the second wall being relatively rigid, the sensor being responsive to force along a response axis thereof, the improvement comprising:
   a sensor assembly including a first end and a second end substantially aligned with the response axis;
   the first end of the sensor assembly engaged with one of the walls;
   means for engaging the second end with the other of the walls to prestress the sensor assembly along the response axis; and
   means for translating substantially all loads introduced along the prestressed response axis at one of the ends to the other of the ends without transmutation outside of the response axis.

3. A sensor according to claims 1 or 2 wherein the means for engaging the second end has at least one load transfer interface surface substantially normal to the response axis.

4. A sensor according to claim 3 wherein the second end is substantially cylindrical and each load transfer interface surface extends radially outward therefrom.

5. A sensor according to claim 4 wherein each load transfer interface surface is delimited circumferentially around the response axis to define a respective arcuate flange.

6. A sensor according to claim 3 wherein the second end is substantially cylindrical and each load transfer interface surface comprises one surface of a respective buttress thread.

7. A sensor according to claim 3 wherein the second end is substantially cylindrical and each load transfer interface surface comprises one surface of a respective trapezoidal thread.

8. In an internal combustion engine, a cylinder pressure sensor of the type being responsive to force along a response axis thereof and disposed between a first wall and a second wall of an engine component housing the first wall substantially defining at least one side of a cylinder and flexing in response to varying pressure therein and the second wall being relatively rigid, the improvement comprising:
- a sensor assembly including a first end and a second end, the first end having threads for engagement with one of the walls, the second end being engaged with the other of the walls,
- wherein said threads are characterized by substantially linear axial load transfer between the first end of the sensor assembly and the wall threadably engaged thereto.

* * * * *